United States Patent
Borade et al.

(10) Patent No.: US 7,435,780 B2
(45) Date of Patent: Oct. 14, 2008

(54) POLY(ARYLENE ETHER) COMPOSITIONS AND METHODS OF MAKING THE SAME

(75) Inventors: Pravin Borade, Maharashtra (IN); Manatesh Chakraborty, Maharashtra (IN); Roshan Kumar Jha, Karnataka (IN); Parnasree Maiti, West Bengal (IN); Prochi Verma, Pune (IN)

(73) Assignee: Sabic Innovavtive Plastics IP B.V. (NL)

( * ) Notice: Subject to any disclaimer, the term of this patent is extended or adjusted under 35 U.S.C. 154(b) by 361 days.

(21) Appl. No.: 11/289,676

(22) Filed: Nov. 29, 2005

(65) Prior Publication Data

US 2007/0123625 A1     May 31, 2007

(51) Int. Cl.
*C08L 27/12*     (2006.01)

(52) U.S. Cl. ............... 525/199; 524/449; 524/451; 524/500; 525/50

(58) Field of Classification Search ......... 525/199, 525/50; 524/500, 451, 449
See application file for complete search history.

(56) References Cited

U.S. PATENT DOCUMENTS

| | | | |
|---|---|---|---|
| 2,071,250 A | 2/1937 | Carothers | 562/71 |
| 2,071,251 A | 2/1937 | Carothers | 524/31 |
| 2,130,523 A | 9/1938 | Carothers | 528/335 |
| 2,130,948 A | 9/1938 | Carothers | 564/153 |
| 2,241,322 A | 5/1941 | Hanford | 526/71 |
| 2,312,966 A | 3/1943 | Hanford | 528/329.1 |
| 2,465,319 A | 3/1949 | Whinfield | 526/71 |
| 2,512,606 A | 6/1950 | Bottom et al. | 528/340 |
| 2,720,502 A | 10/1955 | Caldwell | 528/279 |
| 2,727,881 A | 12/1955 | Caldwell et al. | 528/279 |
| 2,822,348 A | 2/1958 | Haslam | 528/279 |
| 3,047,539 A | 7/1962 | Pengily et al. | 528/285 |
| 3,379,792 A | 4/1968 | Finholt | 260/857 |
| 3,671,487 A | 6/1972 | Abolins | 524/141 |
| 3,953,394 A | 4/1976 | Fox et al. | 524/86 |
| 4,128,526 A | 12/1978 | Borman | 524/539 |
| 4,647,602 A | 3/1987 | Wilczak et al. | 523/204 |
| 4,966,941 A * | 10/1990 | Subramanian | 525/66 |
| 4,970,272 A | 11/1990 | Gallucci | 525/397 |
| 5,489,640 A | 2/1996 | Riding | |
| 5,707,734 A * | 1/1998 | Hawkins et al. | 428/372 |
| 5,804,654 A | 9/1998 | Lo et al. | 525/67 |
| 5,962,587 A | 10/1999 | Gaggar et al. | 525/72 |
| 5,981,656 A * | 11/1999 | McGaughan et al. | 525/66 |
| 6,734,252 B1 * | 5/2004 | Woods | 525/187 |
| 2005/0143508 A1 | 6/2005 | Tyagi et al. | 524/423 |

FOREIGN PATENT DOCUMENTS

| | | | |
|---|---|---|---|
| WO | WO-00/44829 | * | 8/2000 |
| WO | 2005017042 | | 2/2005 |

OTHER PUBLICATIONS

International Search Report for International Application No. PCT/US2006/045346, mailed Oct. 4, 2007, 5 pages.
Written Opinion for International Search Report for International Application No. PCT/US2006/045346, mailed Oct. 14, 2007, 4 pages.
U.S. Appl. No. 11/020,835, filed Dec. 23, 2004, Agarwal et al.

* cited by examiner

*Primary Examiner*—Peter D. Mulcahy
*Assistant Examiner*—Henry Hu
(74) *Attorney, Agent, or Firm*—Cantor Colburn LLP

(57) ABSTRACT

A method of making a resin composition comprises melt mixing a first polymer comprising a polyamide powder or a polyester powder with a fluoropolymer at a temperature below a softening temperature of the fluoropolymer to form a first melt blend; fibrillating the fluoropolymer in the first melt blend to form a fibrillar network in the first melt blend; and melt mixing the first melt blend having the fibrillar network with i) a poly(arylene ether) and a compatibilizing agent or ii) a poly(arylene ether) and a reaction product of the poly (arylene) and a compatibilizing agent.

21 Claims, No Drawings

POLY(ARYLENE ETHER) COMPOSITIONS AND METHODS OF MAKING THE SAME

BACKGROUND OF THE INVENTION

This disclosure relates to poly(arylene ether) compositions, methods of making the poly(arylene ether) compositions and articles made from the poly(arylene ether) compositions.

Poly(arylene ether) resins, such as polyphenylene ether resins (PPE), are an extremely useful class of high performance engineering thermoplastics by reason of their hydrolytic stability, high dimensional stability, toughness, heat resistance, and dielectric properties. This unique combination of properties renders poly(arylene ether) based compositions suitable for a broad range of applications, which are well known in the art. For example, poly(arylene ether) blends are being widely used in the fields of automobile parts, electric parts, office devices, and the like.

Many poly(arylene ether) resin-based articles are manufactured by injection or other molding processes. In order to obtain good mechanical properties such as high modulus, different approaches have been tried, such as using fillers to reinforce poly(arylene ether) blends. Different types of fillers such as glass fibers, aramid fibers, carbon fibers, and various particulate fillers have been used. However, addition of these fillers can lead to brittle failure of the resin and can lower the impact strength of the resin. Where improved ductility has been obtained, such as in the case of aramid fillers, the modulus obtained is very low. In addition, use of fillers can present processing difficulties, due at least in part to lack of compatibility of the filler with the polymer matrix. Such incompatibility can also result in molding and flow-related problems.

Despite advances in the art and the success of many filled polymer compositions, there remains a continuing need for improved combinations of properties such as higher modulus, improved ductility, improved impact, and/or improved melt flow characteristics. Also it is desirable that the article has good impact resistance and ductility without the consequent loss of other desirable characteristics.

BRIEF DESCRIPTION OF THE INVENTION

One embodiment of a method of making a resin composition comprises melt mixing a first polymer comprising a polyamide powder or a polyester powder with a fluoropolymer at a temperature below a softening temperature of the fluoropolymer to form a first melt blend; fibrillating the fluoropolymer in the first melt blend to form a fibrillar network in the first melt blend; and melt mixing the first melt blend having the fibrillar network with i) a poly(arylene ether) and a compatibilizing agent or ii) a poly(arylene ether) and a reaction product of the poly(arylene) and a compatibilizing agent.

Compositions made according to these methods are also disclosed. Further, articles made with the composition are also disclosed.

DETAILED DESCRIPTION OF THE INVENTION

In this specification and in the claims, which follow, reference will be made to a number of terms which shall be defined to have the following meanings.

The singular forms "a," "an," and "the" include plural referents unless the context clearly dictates otherwise.

"Optional" or "optionally" means that the subsequently described event or circumstance may or may not occur, and that the description includes instances where the event occurs and instances where it does not.

"Combination" as used herein includes mixtures, copolymers, reaction products, blends, composites, and the like.

A "powder" as used herein, has particle sizes of 0.5 micrometers to 500 micrometers. Within this range, the particle size may be greater than or equal to 1 micrometer, more specifically greater than or equal to 1.5 micrometers, and even more specifically greater than or equal to 2 micrometers. Also within this range, the particle size may be less than or equal to 200 micrometers, more specifically less than or equal to 100 micrometers, and even more specifically less than or equal to 50 micrometers. Particle size, as defined herein, refers to the maximum size of the particles, although some particles may be smaller, as when a material is sifted through a sieve with a particular mesh size.

The endpoints of all ranges reciting the same characteristic are independently combinable and inclusive of the recited endpoint.

As will be discussed in much greater detail below, a composition comprising a poly(arylene ether), a polymer substantially immiscible with the poly(arylene ether), and a fibrillar fluoropolymer network, has an increased elastic modulus, increased high temperature stability, lower thermal expansion and better retention of strain at break, when compared to a composition without a fibrillar fluoropolymer network.

The polymer substantially immiscible with the poly(arylene ether) (also referred to as an immiscible polymer) comprises a polyamide or a polyester. The composition comprising the poly(arylene ether) and the immiscible polymer comprises two distinct phases: a poly(arylene ether) phase dispersed in or con-continuous with a polyamide or polyester phase. The two phases can be distinguished by standard analytical techniques such as scanning electron microscopy or transmission electron microscopy. In various other embodiments, the composition can further comprise fillers and impact modifiers.

As used herein, a "poly(arylene ether)" comprises a plurality of structural units of the formula (I):

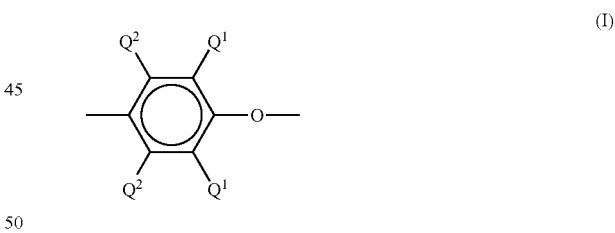

wherein for each structural unit, each $Q^1$ and $Q^2$ is independently hydrogen, halogen, primary or secondary lower alkyl (e.g., an alkyl containing 1 to 7 carbon atoms), phenyl, haloalkyl, aminoalkyl, alkenylalkyl, alkynylalkyl, hydrocarbonoxy, aryl and halohydrocarbonoxy, wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) can comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present.

The poly(arylene ether) can be in the form of a homopolymer; a copolymer; a graft copolymer; an ionomer; or a block copolymer; as well as combinations comprising at least one of the foregoing. For example, in one embodiment, poly (arylene ether) includes polyphenylene ether (PPE) comprising 2,6-dimethyl-1,4-phenylene ether units optionally in combination with 2,3,6-trimethyl-1,4-phenylene ether units.

The poly(arylene ether) can be prepared by the oxidative coupling of monohydroxyaromatic compound(s) such as 2,6-xylenol and 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combinations of two or more of the foregoing.

The poly(arylene ether) prior to functionalization can have a number average molecular weight of 3,000 grams per mole (g/mol) to 40,000 g/mol and a weight average molecular weight of 5,000 g/mol to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s has an initial intrinsic viscosity of 0.25 deciliters per gram (dl/g) to 0.55 deciliters per gram (dl/g), as measured in chloroform at 25° C. Initial intrinsic viscosity is defined as the intrinsic viscosity of the poly(arylene ether) prior to melt mixing with the other components of the composition. As understood by one of ordinary skill in the art, the viscosity of the poly(arylene ether) can be up to 30% higher after melt mixing. The percentage of increase can be calculated by (final intrinsic viscosity after melt mixing—initial intrinsic viscosity)/initial intrinsic viscosity. Determining an exact ratio, when two initial intrinsic viscosities are used, will depend somewhat on the exact intrinsic viscosities of the poly(arylene ether) used and the ultimate physical properties that are desired.

The composition comprises poly(arylene ether) in an amount of 10 to 99.5 weight percent (wt. %). Within this range, the poly(arylene ether) may be present in an amount greater than or equal to 20 wt. %, or, more specifically in an amount greater than or equal to 25 wt. %, or, even more specifically in an amount greater than or equal to 30 wt. %. Also within this range, the poly(arylene ether) may be present in an amount less than or equal to 80 wt. %, or, more specifically, less than or equal to 60 wt. %, or, even more specifically, less than or equal to 45 wt. %. The weight percents are based on a total weight of the composition.

In one embodiment, the immiscible polymer comprises a polyamide. Polyamides, also known as nylons, are characterized by the presence of an amide group (—C(O)NH—), and are described in U.S. Pat. No. 4,970,272. Exemplary polyamides include, but are not limited to, nylon-6; nylon-6,6; nylon-4; nylon-4,6; nylon-12; nylon-6,10; nylon 6,9; nylon-6,12; amorphous polyamide resins; nylon 6/6T and nylon 6,6/6T with triamine contents below 0.5 weight percent; PA 11 having glass transition temperature of 105° C.; PA 12 having a glass transition temperature of 175° C.; PA 6/69 having a glass transition temperature of 200° C.; and combinations comprising at least one of the foregoing polyamides. In one embodiment, the polyamide comprises nylon 6 and nylon 6,6.

Polyamide resins can be obtained by a number of well-known processes such as those described in U.S. Pat. Nos. 2,071,250; 2,071,251; 2,130,523; 2,130,948; 2,241,322; 2,312,966; and 2,512,606. Polyamide resins are commercially available from a wide variety of sources.

Polyamide resins having viscosity of up to 400 milliliter per gram (ml/g) can be used, or, more specifically, having a viscosity of 90 ml/g to 350 ml/g, or, even more specifically, having a viscosity of 110 ml/g to 240 ml/g, as measured in a 0.5 wt. % solution in 96 wt. % sulfuric acid in accordance with ISO 307.

The composition comprises polyamide in an amount of 10 wt. % to 95 wt. %. Within this range, the polyamide may be present in an amount greater than or equal to 20 wt. %, or, more specifically in an amount greater than or equal to 30 wt. %, or, even more specifically in an amount greater than or equal to 45 wt. %. Also within this range, the polyamide may be present in an amount less than or equal to 80 wt. %, or, more specifically, less than or equal to 70 wt. %, or, even more specifically, less than or equal to 50 wt. %. The weight percents are based on a total weight of the composition.

In one embodiment, the immiscible polymer comprises a polyester. Suitable polyesters include those comprising structural units of the formula (II):

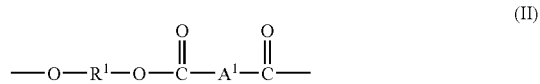

wherein each $R^1$ is independently a divalent aliphatic, alicyclic or aromatic hydrocarbon radical, or mixtures thereof and each $A^1$ is independently a divalent aliphatic, alicyclic or aromatic radical, or mixtures thereof. Examples of suitable polyesters comprising the structure of formula (II) are poly (alkylene dicarboxylate)s, liquid crystalline polyesters, polyarylates, and polyester copolymers such as copolyestercarbonates and polyesteramides. Also included are polyesters that have been treated with relatively low levels of diepoxy or multi-epoxy compounds. It is also possible to use branched polyesters in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make branched polyester. Furthermore, it is sometimes desirable to have various concentrations of acid and hydroxyl endgroups on the polyester, depending on the ultimate end-use of the composition.

In one embodiment, at least some of the polyester comprises nucleophilic groups such as, for example, carboxylic acid groups. In some instances, it is desirable to reduce the number of acid endgroups, typically to less than 30 micro equivalents per gram of polyester, with the use of acid reactive species. In other instances, it is desirable that the polyester has a relatively high carboxylic end group concentration, e.g., 5 to 250 micro equivalents per gram of polyester or, more specifically, 20 to 70 micro equivalents per gram of polyester.

In one embodiment, the $R^1$ radical in formula (II) is a $C_{2-10}$ alkylene radical, a $C_{6-10}$ alicyclic radical or a $C_{6-20}$ aromatic radical in which the alkylene groups contain 2-6 and most often 2 or 4 carbon atoms. The $A^1$ radical in formula (II) is most often p- or m-phenylene or a mixture thereof. This class of polyesters includes the poly(alkylene terephthalates), the poly(alkylene naphthalates) and the polyarylates. Exemplary poly(alkylene terephthalates), include, poly(ethylene terephthalate) (PET), poly(cyclohexanedimethanol terephthalate) (PCT), and poly(butylene terephthalate) (PBT). Exemplary poly(alkylene naphthalate)s include poly(butylene-2,6-naphthalate) (PBN) and poly(ethylene-2,6-naphthalate) (PEN). Other useful polyesters include poly(ethylene-co-cyclohexanedimethanol terephthalate) (PETG), polytrimethylene terephthalate (PTT), poly(dimethanol-1,4-cyclohexanedicarboxylate) (PCCD), and polyxylene terephthalate (PXT). Polyesters are known in the art as illustrated by the following U.S. Pat. Nos.: 2,465,319, 2,720,502, 2,727,881, 2,822,348, 3,047,539, 3,671,487, 3,953,394, and 4,128,526.

The composition comprises polyester in an amount of 10 wt. % to 95 wt. %. Within this range, the polyester may be present in an amount greater than or equal to 20 wt. %, or, more specifically in an amount greater than or equal to 40 wt. %, or, even more specifically in an amount greater than or equal to 50 wt. %. Also within this range, the polyester may be present in an amount less than or equal to 50 wt. %, or, more specifically, less than or equal to 75 wt. %, or, even more specifically, less than or equal to 60 wt. %. The weight percents are based on a total weight of the composition.

Depending on the choice of immiscible polymer the composition may be prepared using a polyamide compatibilizing agent or a polyester compatibilizing agent.

When used herein, the expression "polyamide compatibilizing agent" refers to polyfunctional compounds, which interact with the poly(arylene ether), the polyamide resin, or both. This interaction between the polyamide compatibilizing agent and the poly(arylene ether) may be chemical (e.g., grafting) and/or physical (e.g., affecting the surface characteristics of the dispersed phases). In either instance the resulting compatibilized poly(arylene ether)/polyamide composition appears to exhibit improved compatibility, specifically as evidenced by enhanced impact strength, mold knit line strength and/or elongation. As used herein, the expression "compatibilized poly(arylene ether)/polyamide blend" refers to those compositions which have been physically and/or chemically compatibilized with an agent as discussed above, as well as those compositions which are physically compatible without such agents, as taught in U.S. Pat. No. 3,379,792.

In one embodiment, the polyamide compatibilizing agent comprises a polyfunctional compound. Polyfunctional compounds, which may be employed as the polyamide compatibilizing agent, are of three types. The first type of polyfunctional compounds are those having in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; umaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g., acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (e.g. alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer less than or equal to 30); unsaturated amines resulting from replacing from replacing the —OH group(s) of the above unsaturated alcohols with NH2 groups; functionalized diene polymers and copolymers; and combinations comprising one or more of the foregoing. In one embodiment, the polyamide compatibilizing agent comprises maleic anhydride and/or fumaric acid.

The second type of polyfunctional compatibilizing agents are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and various salts thereof. Typical of this group of compatibilizers are the aliphatic polycarboxylic acids, acid esters and acid amides represented by the formula:

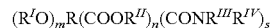

wherein R is a linear or branched chain, saturated aliphatic hydrocarbon having 2 to 20, or, more specifically, 2 to 10, carbon atoms; $R^1$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein $(OR^I)$ is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polycarboxylic acids include, for example, citric acid, malic acid, agaricic acid; including the various commercial forms thereof, such as for example, the anhydrous and hydrated acids; and combinations comprising one or more of the foregoing. In one embodiment, the polyamide compatibilizing agent comprises citric acid. Illustrative of esters useful herein include, for example, acetyl citrate, mono- and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivates include the salts thereof, including the salts with amines and the alkali and alkaline metal salts. Exemplary of suitable salts include calcium malate, calcium citrate, potassium malate, and potassium citrate.

The third type of polyfunctional compatibilizing agents are characterized as having in the molecule both (a) an acid halide group and (b) at least one carboxylic acid, anhydride, ester, epoxy, orthoester, or amide group, specifically a carboxylic acid or anhydride group. Examples of compatibilizers within this group include trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the polyamide compatibilizing agent comprises trimellitic anhydride acid chloride.

The foregoing polyamide compatibilizing agents are melt blended or pre-reacted in solution with the poly(arylene ether) prior to melt blending with the polyamide and the fluoropolymer. The amount of the polyamide compatibilizing agent used will be dependent upon the specific compatibilizing agent chosen and the specific polymeric system to which it is added.

When the immiscible polymer is a polyester, the composition also comprises a polyester compatibilizer, which is a polymeric compatibilizer. As used herein and throughout, a polymeric compatibilizer is a polymeric polyfunctional compound that interacts with the poly(arylene ether) resin, the polyester resin, or both. This interaction may be chemical (e.g. grafting) and/or physical (e.g. affecting the surface characteristics of the dispersed phases). When the interaction is chemical, the compatibilizer may be partially or completely reacted with the poly(arylene ether) resin, polyester resin or both such that the composition comprises a reaction product. Use of the polymeric compatibilizer can improve the compatibility between the poly(arylene ether) and the polyester, as may be evidenced by enhanced impact strength, mold knit line strength and/or elongation.

Suitable polymeric compatibilizers comprise epoxy compounds, and include, but are not limited to, copolymers comprising structural units having pendant epoxy groups. In some embodiments suitable polymeric compatibilizers comprise copolymers comprising structural units derived from at least one monomer comprising a pendant epoxy group and at least one olefinic monomer, wherein the content derived from monomer comprising a pendant epoxy group is greater than or equal to 6 wt. %, or, more specifically, greater than or equal to 8 wt. %, or, even more specifically greater than or equal to 10 wt. %. Illustrative examples of suitable compatibilizers include, but are not limited to, copolymers of glycidyl methacrylate (GMA) with alkenes, copolymers of GMA with alkenes and acrylic esters, copolymers of GMA with alkenes and vinyl acetate. Suitable alkenes comprise ethylene, propylene, and mixtures comprising ethylene and propylene. Suitable acrylic esters comprise alkyl acrylate monomers, including, but not limited to, methyl acrylate, ethyl acrylate, propyl acrylate, butyl acrylate, and combinations of the foregoing alkyl acrylate monomers. When present, said acrylic ester may be used in an amount of 15 wt. % to 35 wt. % based on the total amount of monomer used in the copolymer. When present, vinyl acetate may be used in an amount of 4 wt. % to 10 wt. % based on the total amount of monomer used in the copolymer. Illustrative examples of suitable compatibilizers comprise ethylene-glycidyl acrylate copolymers, ethylene-glycidyl methacrylate copolymers, ethylene-glycidyl methacrylate-vinyl acetate copolymers, ethylene-glycidyl methacrylate-alkyl acrylate copolymers, ethylene-glycidyl methacrylate-methyl acrylate copolymers, ethylene-glycidyl methacrylate-ethyl acrylate copolymers, and ethylene-glycidyl methacrylate-butyl acrylate copolymers.

Suitable polymeric compatibilizers are available from commercial sources, including Sumitomo Chemical Co., Ltd. under the trademarks BONDFAST 2C (also known as IGETABOND 2C; which is a copolymer comprising structural units derived from 94 wt. % ethylene, and 6 wt. % glycidyl methacrylate); BONDFAST E (also known as IGETABOND E; which is a copolymer comprising structural units derived from 88 wt. % ethylene, and 12 wt. % glycidyl methacrylate); IGETABOND 2B, 7B, and 20B (which are copolymers comprising structural units derived from 83 wt. % ethylene, 5 wt. % vinyl acetate, and 12 wt. % glycidyl methacrylate); IGETABOND 7M and 20M (which are copolymers comprising structural units derived from 64 wt. % ethylene, 30 wt. % methyl acrylate, and 6 wt. % glycidyl methacrylate); and from Atofina under the trademark LOTADER 8840 (which is a copolymer comprising structural units derived from 92 wt. % ethylene, and 8 wt. % glycidyl methacrylate); and LOTADER 8900 (which is a copolymer comprising structural units derived from 67 wt. % ethylene, 25 wt. % methyl acrylate, and 8 wt. % glycidyl methacrylate). Mixtures of the aforementioned compatibilizers may also be employed. In one embodiment, the compatibilizer is substantially stable at the processing temperature of the final resinous composition.

The foregoing polyester compatibilizer may be added directly to the composition or pre-reacted with either or both of the poly(arylene ether) resin and polyester resin, as well as with other materials employed in the preparation of the composition. The initial amount of the compatibilizer used and order of addition will depend upon the specific compatibilizer chosen and the specific amounts of poly(arylene ether) resin and polyester resin employed, and may be readily determined by those skilled in the art.

The composition can comprise 0.1 wt. % to 20 wt. % of polyester compatibilizer or polyamide compatibilizer, based on the total weight of the composition. Within this range, the composition can comprise less than or equal to 15 wt. %, or, more specifically less than or equal to 10 wt. %, or, even more specifically, less than or equal to 8 wt. % compatibilizer. Also within this range, the composition may comprise greater than or equal to 0.5 wt. %, or, more specifically, greater than or equal to 1 wt. %.

Fluoropolymers suitable for use as the fluoropolymer component are powders capable of being fibrillated ("fibrillatable") during mixing with at least the poly(arylene ether). "Fibrillation" is a term of art that refers to the treatment of fluoropolymers so as to produce, for example, a "node and fibril," network, or cage-like structure. Suitable fluoropolymers include, but are not limited, to homopolymers and copolymers that comprise structural units derived from one or more fluorinated alpha-olefin monomers, that is, an alpha-olefin monomer that includes at least one fluorine atom in place of a hydrogen atom.

In one embodiment, the fluoropolymer comprises structural units derived from two or more fluorinated alpha-olefin, for example tetrafluoroethylene, hexafluoroethylene, and the like. In another embodiment, the fluoropolymer comprises structural units derived from one or more fluorinated alpha-olefin monomers and one or more non-fluorinated monoethylenically unsaturated monomers that are copolymerizable with the fluorinated monomers, for example alpha-monoethylenically unsaturated copolymerizable monomers such as ethylene, propylene, butene, acrylate monomers (e.g., methyl methacrylate and butyl acrylate), vinyl ethers, (e.g., cyclohexyl vinyl ether, ethyl vinyl ether, n-butyl vinyl ether, vinyl esters) and the like. Specific examples of fluoropolymers include polytetrafluoroethylene (PTFE), polyhexafluoropropylene, polyvinylidene fluoride, polychlorotrifluoroethylene, ethylene tetrafluoroethylene, fluorinated ethylene-propylene, polyvinyl fluoride, and ethylene chlorotrifluoroethylene. Combinations comprising at least one of the foregoing fluoropolymers may also be used.

In one embodiment, the fluoropolymer is at least partially encapsulated by an encapsulating polymer that may be the same or different as the matrix polymer (hereinafter referred to as an "encapsulated polymer"). Without being bound by theory, it is believed that encapsulation may aid in the distribution of the fluoropolymer within the matrix, and/or compatibilize the fluoropolymer with the matrix dispersed phase or both the matrix and the dispersed phase.

Suitable encapsulating polymers include, but are not limited to, vinyl polymers, acrylic polymers, polyacrylonitrile, polystyrenes, polyolefins, polyesters, polyurethanes, polyamides, polysulfones, polyimides, polyetherimides, polyphenylene ethers, polyphenylene sulfides, polyether ketones, polyether ether ketones, ABS resins, polyethersulfones, poly(alkenylaromatic) polymers, polybutadiene, liquid crystalline polymers, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and combinations comprising at least one of the foregoing polymers.

The encapsulating polymers may be obtained by polymerization of monomers or mixtures of monomers by methods known in the art, for example, condensation, addition polymerization, and the like. Emulsion polymerization, specifically radical polymerization may be used effectively. In one embodiment, the encapsulating polymer is formed from monovinylaromatic monomers containing condensed aromatic ring structures, such as vinyl naphthalene, vinyl anthracene and the like. Examples of suitable monovinylaromatic monomers include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be specifically mentioned.

Other useful monomers for the formation of the encapsulating polymer include monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and the like. Other examples of monomers include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers.

Mixtures of the foregoing monovinylaromatic monomers and monovinylic monomers may also be used, for example mixtures of styrene and acrylonitrile (SAN). The relative ratio of monovinylaromatic and monovinylic monomers in the rigid graft phase may vary widely depending on the type of fluoropolymer, type of monovinylaromatic and monovinylic monomer(s), and the desired properties of the encapsulant. The encapsulant may generally be formed from up to 100 wt. % of monovinyl aromatic monomer, specifically 30 wt. % to 100 wt. %, more specifically 50 wt. % to 90 wt. % monovinylaromatic monomer, with the balance being comonomer(s), wherein weight percents are based on a total weight of the encapsulant.

Elastomers may also be used as the encapsulating polymer, as well as elastomer-modified graft copolymers. Suitable elastomers include, for example, conjugated diene rubbers; copolymers of a conjugated diene with less than 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as combinations comprising at least one of the foregoing conjugated diene monomers. Specific conjugated diene homopolymers include polybutadiene and polyisoprene.

Copolymers of a conjugated diene rubbers may also be used, for example those produced by aqueous radical emulsion polymerization of a conjugated diene and up to 10 wt. % of one or more monomers copolymerizable therewith. Specific copolymers include styrene and acrylonitrile.

(Meth)acrylate monomers suitable for use as an elastomeric encapsulating monomer include the cross-linked, particulate emulsion homopolymers or copolymers of $C_{4-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{4-8}$ alkyl (meth)acrylate monomers may optionally be polymerized in admixture with up to 15 wt. % of comonomers. Exemplary comonomers include, but are not limited to, butadiene, isoprene, styrene, methyl methacrylate, phenyl methacrylate, phenethylmethacrylate, N-cyclohexylacrylamide, vinyl methyl ether or acrylonitrile, and combinations comprising at least one of the foregoing comonomomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

Suitable elastomer-modified graft copolymers may be prepared by first providing an elastomeric polymer (for example, as described above), then polymerizing the constituent monomer(s) of the rigid phase in the presence of the fluoropolymer and the elastomer to obtain the graft copolymer. The elastomeric phase may provide 5 wt. % to 95 wt. % of the total graft copolymer, more specifically 20 wt. % to 90 wt. %, and even more specifically 40 wt. % to 85 wt. % of the elastomer-modified graft copolymer, the remainder being the rigid graft phase. Depending on the amount of elastomer-modified polymer present, a separate matrix or continuous phase of ungrafted rigid polymer or copolymer may be simultaneously obtained along with the elastomer-modified graft copolymer.

Specific encapsulating polymers include polystyrene, copolymers of polystyrene, poly(alpha-methylstyrene), poly (alpha-ethylstyrene), poly(alpha-propylstyrene), poly(alpha-butylstyrene), poly(p-methylstyrene), polyacrylonitrile, polymethacrylonitrile, poly(methyl acrylate), poly(ethyl acrylate), poly(propyl acrylate), and poly(butyl acrylate), poly(methyl methacrylate), poly(ethyl methacrylate), poly (propyl methacrylate), poly(butyl methacrylate); polybutadiene, copolymers of polybutadiene with propylene, poly(vinyl acetate), poly(vinyl chloride), poly(vinylidene chloride), poly(vinylidene fluoride), poly(vinyl alcohols), acrylonitrile-butadiene copolymer rubber, acrylonitrile-butadiene-styrene (ABS), poly($C_{4-8}$ alkyl acrylate) rubbers, styrene-butadiene rubbers (SBR), EPDM rubbers, silicon rubber and combinations comprising at least one of the foregoing encapsulating polymers.

In another embodiment, the encapsulating polymer comprises SAN, ABS copolymers, alpha-($C_{1-3}$)alkyl-styrene-acrylonitrile copolymers, alpha-methylstyrene-acrylonitrile (AMSAN) copolymers, SBR, and combinations comprising at least one of the foregoing. In yet another embodiment the encapsulating polymer is SAN or AMSAN.

Suitable amounts amount of encapsulating polymer may be determined by one of ordinary skill in the art without undue experimentation, using the guidance provided below. In one embodiment, the encapsulated fluoropolymer comprises 1.5 wt % to 98.5 wt % fluoropolymer and 98.5 wt % to 1.5 wt % of the encapsulating polymer, based on the total weight of the encapsulated fluoropolymer. Within this range, the fluoropolymer may be present in an amount greater than or equal to 30 wt %, or, even more specifically in an amount greater than or equal to 40 wt %. Also within this range, the fluoropolymer may be present in an amount less than or equal to 60 wt %, or, more specifically, less than or equal to 55 wt %, or, even more specifically, less than or equal to 50 wt %.

The composition can comprise 0.5 wt % to 30 wt % fluoropolymer, based on the total weight of the composition. Within this range, the fluoropolymer may be present in an amount greater than or equal to 20 wt %, or, even more specifically in an amount greater than or equal to 15 wt %. Also within this range, the fluoropolymer may be present in an amount less than or equal to 15 wt %, or, more specifically, less than or equal to 10 wt %, or, even more specifically, less than or equal to 2 wt %.

In various embodiments, other fibrillating systems can be used in addition to or alternative to the fluoropolymer component. Other fibrillating systems include, but are not limited to, liquid crystalline polymers (LCPs) and cellulosic fibrils.

In one embodiment, the composition further comprises a filler, including fillers and solid compounding ingredients or agents commonly used in polymeric compositions. One useful class of fillers is the particulate fillers, which may be of any configuration, for example spheres, plates, fibers, acicular, flakes, whiskers, or irregular shapes. Suitable fillers typically have an average longest dimension of 1 nanometer to 500 micrometers, specifically 10 nanometers to 100 micrometers. The average aspect ratio (length:diameter) of some fibrous, acicular, or whisker-shaped fillers (e.g., glass or wollastonite) may be 1.5 to 1,000, although longer fibers may also be employed. The mean aspect ratio (mean diameter of a circle of the same area: mean thickness) of plate-like fillers (e.g., mica, talc, or kaolin) may be greater than 5, specifically 10 to 1000, more specifically 10 to 200. Bimodal, trimodal, or higher mixtures of aspect ratios may also be used.

The fillers may be of natural or synthetic, mineral or non-mineral origin, provided that the fillers have sufficient thermal resistance to maintain their solid physical structure at least at the processing temperature of the composition with which it is combined. Suitable fillers include clays, nano-clays, carbon black, wood flour either with or without oil, various forms of silica (precipitated or hydrated, fumed or pyrogenic, vitreous, fused or colloidal, including common sand), glass, metals, inorganic oxides (such as oxides of the metals in Periods 2, 3, 4, 5 and 6 of Groups Ib, IIb, IIIa, IIIb, IVa, IVb (except carbon), Va, VIa, VIIa and VIII of the Periodic Table), oxides of metals (such as aluminum oxide, titanium oxide, zirconium oxide, titanium dioxide, nanoscale titanium oxide, aluminum trihydrate, vanadium oxide, and magnesium oxide), hydroxides of aluminum or ammonium or magnesium, carbonates of alkali and alkaline earth metals (such as calcium carbonate, barium carbonate, and magnesium carbonate), antimony trioxide, calcium silicate, diatomaceous earth, fuller earth, kieselguhr, mica, talc, slate flour, volcanic ash, cotton flock, asbestos, kaolin, alkali and alkaline earth metal sulfates (such as sulfates of barium and calcium sulfate), titanium, zeolites, wollastonite, titanium boride, zinc borate, tungsten carbide, ferrites, molybdenum disulfide, asbestos, cristobalite, aluminosilicates including vermiculite, bentonite, montmorillonite, Na-montmorillonite, Ca-montmorillonite, hydrated sodium calcium aluminum magnesium silicate hydroxide, pyrophyllite, magnesium aluminum silicates, lithium aluminum silicates, zirconium silicates, and combinations comprising at least one of the foregoing fillers. Suitable fibrous fillers include glass fibers, basalt fibers, aramid fibers, carbon fibers, carbon nanofibers, carbon nanotubes, carbon buckyballs, ultra high molecular weight polyethylene fibers, melamine fibers, polyamide fibers, cellulose fiber, metal fibers, potassium titanate whiskers, and aluminum borate whiskers.

Of these, calcium carbonate, talc, glass fibers, carbon fibers, magnesium carbonate, mica, silicon carbide, kaolin, wollastonite, calcium sulfate, barium sulfate, titanium, silica, carbon black, ammonium hydroxide, magnesium hydroxide, aluminum hydroxide, and combinations comprising at least one of the foregoing are specifically useful. It has been found that mica, talc, silicon carbide, and combinations comprising at least one of the foregoing fillers are of specific utility.

Alternatively, or in addition to a particulate filler, fibrous fillers can be incorporated into the fibrillar network. Suitable fibrous fillers include, for example, glass fiber-carbon fiber, carbon fiber-aromatic polyimide (aramid) fiber, and aromatic polyimide fiberglass fiber or the like.

Optionally, the fillers may be surface modified, for example treated so as to improve the compatibility of the filler and the polymeric portions of the compositions, which facilitates deagglomeration and the uniform distribution of fillers into the polymers. One suitable surface modification is the durable attachment of a coupling agent that subsequently bonds to the polymers. Use of suitable coupling agents may also improve impact, tensile, flexural, and/or dielectric properties in plastics and elastomers; film integrity, substrate adhesion, weathering and service life in coatings; and application and tooling properties, substrate adhesion, cohesive strength, and service life in adhesives and sealants. Suitable coupling agents include silanes, titanates, zirconates, zircoaluminates, carboxylated polyolefins, chromates, chlorinated paraffins, organosilicon compounds, and reactive cellulosics. The fillers may also be partially or entirely coated with a layer of metallic material to facilitate conductivity, e.g., gold, copper, silver, and the like.

The composition comprises filler in an amount of 0.5 wt. % to 20 wt. %. Within this range, the filler may be present in an amount greater than or equal to 3 wt. %, or, more specifically in an amount greater than or equal to 5 wt. %, or, even more specifically in an amount greater than or equal to 8 wt. %. Also within this range, the filler may be present in an amount less than or equal to 40 wt. %, or, more specifically, less than or equal to 30 wt. %, or, even more specifically, less than or equal to 20 wt. %. The weight percents are based on a total weight of the composition.

In one embodiment, the composition further comprise one or more agents to improve the impact strength, i.e., an impact modifier. Impact modifiers can be block copolymers containing aryl alkylene repeating units, for example, A-B diblock copolymers and A-B-A triblock copolymers having of one or two aryl alkylene blocks A (blocks having aryl alkylene repeating units), which are typically styrene blocks, and a rubber block, B, which is typically an isoprene or butadiene block. The butadiene block may be partially or completely hydrogenated. Mixtures of these diblock and triblock copolymers may also be used as well as mixtures of non-hydrogenated copolymers, partially hydrogenated copolymers, fully hydrogenated copolymers and combinations of two or more of the foregoing.

A-B and A-B-A copolymers include, but are not limited to, polystyrene-polybutadiene, polystyrene-poly(ethylene-propylene), polystyrene-polyisoprene, poly($\alpha$-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), polystyrene-poly(ethylene-propylene-styrene)-polystyrene, and the like. Mixtures of the aforementioned block copolymers are also useful. Such A-B and A-B-A block copolymers are available commercially from a number of sources, including Phillips Petroleum under the trademark SOLPRENE, Kraton Polymers, under the trademark KRATON, Dexco under the trademark VECTOR, Asahi Kasai under the trademark TUFTEC, Total Petrochemicals under the trademarks FINA-PRENE and FINACLEAR and Kuraray under the trademark SEPTON.

In one embodiment, the impact modifier comprises polystyrene-poly(ethylene-butylene)-polystyrene, polystyrene-poly(ethylene-propylene) or a combination of the foregoing.

Another type of impact modifier is essentially free of aryl alkylene repeating units and comprises one or more moieties selected from the group consisting of carboxylic acid, anhydride, epoxy, oxazoline, and orthoester. Essentially free is defined as having aryl alkylene units present in an amount less than 5 weight percent, or, more specifically, less than 3 weight percent, or, even more specifically less than 2 weight percent, based on the total weight of the block copolymer. When the impact modifier comprises a carboxylic acid moiety the carboxylic acid moiety may be neutralized with an ion, specifically a metal ion such as zinc or sodium. It may be an alkylene-alkyl (meth)acrylate copolymer and the alkylene groups may have 2 to 6 carbon atoms and the alkyl group of the alkyl (meth)acrylate may have 1 to 8 carbon atoms. This type of polymer can be prepared by copolymerizing an olefin, for example, ethylene and propylene, with various (meth)acrylate monomers and/or various maleic-based monomers. The term (meth)acrylate refers to both the acrylate as well as the corresponding methacrylate analogue. Included within the term (meth)acrylate monomers are alkyl (meth)acrylate monomers as well as various (meth)acrylate monomers containing at least one of the aforementioned reactive moieties.

In a one embodiment, the copolymer is derived from ethylene, propylene, or mixtures of ethylene and propylene, as the alkylene component; butyl acrylate, hexyl acrylate, or propyl acrylate as well as the corresponding alkyl (methyl) acrylates, for the alkyl (meth)acrylate monomer component, with acrylic acid, maleic anhydride, glycidyl methacrylate or a combination thereof as monomers providing the additional reactive moieties (i.e., carboxylic acid, anhydride, epoxy).

Exemplary first impact modifiers are commercially available from a variety of sources including ELVALOY PTW, SURLYN, and FUSABOND, all of which are available from DuPont.

The aforementioned impact modifiers can be used singly or in combination.

The composition may comprise an impact modifier or a combination of impact modifiers, in an amount of 1 wt. % to 25 wt. %. Within this range, the impact modifier may be present in an amount greater than or equal to 1.5 wt. %, or, more specifically, in an amount greater than or equal to 2 wt. %, or, even more specifically, in an amount greater than or equal to 4 wt. %. Also within this range, the impact modifier may be present in an amount less than or equal to 20 wt. %, or, more specifically, less than or equal to 18 wt. %, or, even more specifically, less than or equal to 15 wt. %. Weight percent is based on a total weight of the composition.

In various embodiments, the composition can also include effective amounts of at least one additive such as anti-oxidants, flame retardants, drip retardants, dyes, pigments, colorants, stabilizers, antistatic agents, plasticizers, lubricants, and combinations comprising at least one of the foregoing. These additives are known in the art, as are their effective levels and methods of incorporation. Effective amounts of the additives vary widely, but they can be present a total amount up to 60% or more by weight, of the total weight of the composition. In general, additives such as anti-oxidants, flame retardants, drip retardants, dyes, pigments, colorants, stabilizers, antistatic agents, plasticizers, lubricants, and the like are present in amounts of 0.01 wt. % to 5 wt. % of the total weight of the composition, while small particle mineral fillers and glass fibers comprise 1 wt. % to 60 wt. % of the total weight of the composition.

In making the composition, the fluoropolymer, and the immiscible polymer are each in the powder form. When the immiscible polymer is in the powder form, a higher contact surface area with the fluoropolymer is obtained compared to compositions made using granular or pellet resins. This relatively higher contact surface area between the resins and the fluoropolymer leads to better stress transfer to the fluoropolymer, which leads to effective fibrillation of the fluoropolymer. The fibrillation of the fluoropolymer results in a three-dimensional fibrillar network in the composition, which acts as load bearing structures.

In one embodiment, the immiscible polymer has a sufficiently high viscosity to allow the fluoropolymer to be fibrillated. For example, a suitable viscosity is greater than or equal to 900 Pascal seconds (Pas) at a shear rate of 200 inverse seconds. Without wanting to be bound by theory, greater fibrillation is obtained when the powder form of the immiscible powder compared to a highly viscous immiscible polymer, since the powder represents an "infinite" viscosity.

In one embodiment, the fluoropolymer is melt mixed in a high shear environment with the immiscible polymer and any other resins that may be employed. On shearing the fluoropolymer, the crystallite domains become entangled and as they slip past each other crystals are pulled out from the domains to create fibrils. The remnants of the domains are referred to as "chunks" or "nodes".

In one embodiment the composition made as described herein has a node to fibril ratio of less than or equal to 5, or, more specifically, less than or equal to 2, or, even more specifically, less than or equal to 1.

Suitable mixing methods for achieving the desired shear include, but are not limited to, extrusion kneading, roll kneading, or mixing in a two-roll mill, a Banbury mixer, a single screw or twin-screw extruder, a double blade batch mixer, a vertical shaft mixer, a planetary mixer, a Becken blade mixer, a dispersion blade mixer, a sigma mixer, in continuous batch mixers of the hydrofoil, turbine blade, or CF impeller blade type, static mixers and the like devices, which are capable of imparting a controlled degree of shear. In one embodiment, a single screw or a twin-screw extruder is used. The twin-screw extruder may be co-rotating, counter rotating, intermeshing, non-intermeshing, or the like, for example a, planetary gear extruder readco continuous mixer. The mixing may be conducted in a continuous or a batch process. When melt blending or reactive melt blending is used, the mixing is generally conducted at a temperature and for a time effective to produce a molten mixture of a substantially homogenous composition, wherein the temperature is less than the softening temperature of the fluoropolymer.

In one embodiment, the twin-screw extruder is a two-lobe extruder. Without wanting to be bound by theory, a two-lobe extruded provides a large free volume when compared to a three-lobe extruder. This relatively larger free volume allows more space for the crystallite domains to slip past each other and create fibrils. A two-lobe extruder allows a three-dimensional network to freely develop without collapsing back into aggregates due to a lack of space. Further, compared to a three-lobe extruder, less shear is developed in the two-lobe extruder, which results in lower melt temperatures.

While many mixing methods can be employed as discussed above, for illustrative purposes the shear stress generated in any extruder is described by the following equation:

$$\tau = \eta * \gamma$$

wherein, τ=Shear stress; η=Viscosity of melt; γ=Shear rate. For a given screw design, shear rate remains constant, consequently as the viscosity of the melt increases shear stress within the extruder increases. A powder, such as a polyamide powder, would represent an "infinite" viscosity in the solid form. As discussed in greater detail in relation to the examples, when polyamide pellets are melt mixed with the fluoropolymer (e.g., PTFE), a network of fibrillated fluoropolymer does not result. Without wanting to be bound by theory, this phenomenon can be attributed to the relatively low viscosity of molten polyamide, which cannot adequately transfer stress to the fluoropolymer to shear it successfully.

In one embodiment, the poly(arylene ether) is precompounded with the compatibilizing agent to form a functionalized poly(arylene ether). The functionalized poly(arylene ether) is then compounded with the other ingredients. Without wanting to be bound by theory, it is believed that the fluoropolymer may interfere with compatibilization between the poly(arylene ether) and the polyamide or polyester. However, it has been discovered that blends made using a poly (arylene ether) that has been precompounded with the compatibilizing agent have improved dispersion of the fluoropolymer compared to blends made without using poly (arylene ether) that has been precompounded with the compatibilizing agent. This improved dispersion lead to, among other things, an improvement in modulus compared to compositions made without using poly(arylene ether) that has been precompounded with the compatibilizing agent.

The immiscible polymer and the fluoropolymer are introduced in a melt mixing device prior to the addition of the poly(arylene ether) and compatibilizing agent or the poly (arylene ether) and the reaction product of the poly(arylene ether) and the compatibilizing agent, i.e., in a "reverse" order compared to first adding poly(arylene ether) and then adding polyamide. Since polyamide and the fluoropolymer are introduced to the melt mixing device prior to the addition of poly(arylene ether), this allows a relatively lower temperature to be employed in an extruder compared to the temperature employed when the poly(arylene ether) is added. The relatively lower temperature in for example, the first 6 barrels of an extruder, allows for increased shearing of the fluoropolymer. Also, due to the initial barrels having lower temperatures, the equilibrium melt temperature is lower, which prevents destruction of the three-dimensional network.

After the composition is formed it is typically formed into strands, which are cut to form pellets. The strand diameter and the pellet length are typically chosen to prevent or reduce the production of fines (particles that have a volume less than or equal to 50% of the pellet) and for maximum efficiency in subsequent processing such as profile extrusion. An exemplary pellet length is 1 to 5 millimeters and an exemplary pellet diameter is 1 to 5 millimeters.

In one embodiment, the immiscible polymer and the fluoropolymer are melt mixed to form a melt blend comprising a fibrillated network of fluoropolymer. The resulting melt blend can be formed into strands, which are cut into pellets as discussed above. These pellets can later be melt mixed with a functionalized poly(arylene ether), wherein the poly(arylene ether) is added to the melted pellets comprising the blend of immiscible polymer and the fluoropolymer. In another embodiment, the immiscible polymer and the fluoropolymer are melted to form a first melt blend and the functionalized poly(arylene ether) is melted and mixed with the first melt blend.

The composition may be converted to articles using low shear thermoplastic processes such as film and sheet extrusion, profile extrusion, extrusion molding, compression molding and blow molding. Film and sheet extrusion processes may include and are not limited to melt casting, blown film extrusion and calendaring. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow-coating.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The compositions may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1. Providing a single or multi-layer thermoplastic substrate having optionally one or more colors on the surface, for instance, using screen printing or a transfer dye
2. Conforming the substrate to a mold configuration such as by forming and trimming a substrate into a three dimensional shape and fitting the substrate into a mold having a surface which matches the three dimensional shape of the substrate.
3. Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

Accordingly, another embodiment relates to articles, sheets and films prepared from the compositions above.

Exemplary articles include all or portions of the following articles: furniture, partitions, containers, vehicle interiors including rail cars, subway cars, busses, trolley cars, airplanes, automobiles, and recreational vehicles, exterior vehicle accessories such as roof rails, appliances, cookware, electronics, analytical equipment, window frames, wire conduit, flooring, infant furniture and equipment, telecommunications equipment, antistatic packaging for electronics equipment and parts, health care articles such as hospital beds and dentist chairs, exercise equipment, motor covers, display covers, business equipment parts and covers, light covers, signage, air handling equipment and covers, automotive underhood parts.

The following non-limiting examples further illustrate the various embodiments described herein.

EXAMPLES

Compositions described herein were extruded in a co-rotating, twin-screw, 6-barrel extruder from WERNER & PFLEIDERER Co. (ZSK-1). The components of the compositions and their source are listed in Table 1. Weights are expressed in weight percent with respect to the total weight of the composition. Components are listed in Table 1.

Tensile modulus and elongation at break was determined in accordance with ISO 527 at room temperature, using a rate of pull of 1 millimeter (mm) per minute until 1% strain followed by 50 mm per minute until the sample broke. The samples were injection molded at 290/280/270° C. with nozzle temperature set at 295° C. Injection speed was 18 to 22 mm/second; injection pressure was maintained at 50 to 60 bar; holding pressure range was 45 to 55 bar; holding time varied from 8 to 12 seconds. Cooling time was 20 seconds at a mold temperature of 80 to 120° C. The tensile bars were 4 mm thick and 10 mm wide. Tensile modulus values are in GigaPascals (GPa). Elongation at break values are in percentage. Coefficient of thermal expansion (CTE) was measured using ASTM E-831. Notched Izod (impact strength) was determined according to ISO 180 and values are in kilojoules per square meter. determining extent of fibrillation of PTFE in the various compositions was used to monitor degree of fibrillation. A Q1000 differential scanning calorimeter from TA Instruments was used to conduct DSC on approximately 1 to 5 mg of sample, and observations recorded around 320 to 360° C. (modulation range). A peak around 330° C. is observed, and may be deconvoluted into three different peaks, wherein the different peak temperatures correspond to different forms of PTFE. A plot was constructed using the raw data points from MDSC, and through baseline adjustment a clear magnified peak was observed (after subtraction). Deconvolution was made to fit Gaussian curves around 326° C. for melt crystallized PTFE, 330° C. for fibrillated PTFE, and 338° C. for native PTFE (nodal PTFE). The area under each curve was found to have a strong correlation with optimization of properties such as tensile modulus. In particular, a Node: Fibril ratio may be calculated based on the area under 338° C. peak (node) and 330° C. peak (fibril).

TABLE 1

| Component | Trade name/Supplier |
| --- | --- |
| PPE | A poly(2,6-dimethyl-1,4-phenylene ether) having intrinsic viscosity of 0.38 dl/g/GE Plastics Poly(2,6-dimethylphenylene ether) was obtained from GE Plastics and had a weight average molecular weight (Mw) of about 44,000 and an intrinsic viscosity of about 0.4 deciliters per gram (dl/g) measured in chloroform at 23° C. |
| GTX | A polyamide/poly(arylene ether) blend from GE Plastics. |
| Polyamide | Nylon 6 available as Technyl ASN27/32-35 lc from Rhodia; Nylon 6 Powder (AQ 500 L), Aquafil, Italy |
| First Impact Modifier-Polystyrene-poly(ethylene butylene)-Polystyrene block copolymer (SEBS) | Available as KRATON ® G1651E from Shell Nederland BV and had an Mw of 267,500. |
| Second Impact Modifier-Polystyrene-poly(ethylene propylene) block copolymer (SEP) | Available as KRATON ® G1701E from Shell Nederland BV and had an Mw of 152400. |
| Compatibilizer - Citric acid | Citric acid available from SD Fine Chem Ltd. |
| Conductive carbon black (CCB) | Ketjen black EC 600JD/Akzo Nobel |
| Stabilizer | IRGANOX 1076 Ciba Specialty Chemicals |
| TSAN | SAN coated PTFE (GE Plastics) |
| Talc | Fintalc (M105) Barretts Minerals, Montana |
| PBT 315 | A polyester available from GE Plastics under the tradename Valox. |

In the examples summarized in Tables 2 and 3, TSAN was combined with polyamide powder or polyester powder in the throat of the ZSK-1 extruder. The barrel temperature was set at 230° C., which was below the melting point of PTFE, wherein the melting point of the PTFE was 325° C. Torque was maintained at 65% to 70%. The feed rate was maintained at 15 kilograms per hour.

After mixing, the compositions were made into a particulate form by pelletizing. Pellets were injection molded into tensile bars using an L&T Demag De-Tech 60 T LNC4-E molding machine.

TABLE 2

|  | Ex. 1 (Pellet) | Ex. 2 (Pellet) | Ex. 3 (Pellet) | Ex. 4 (Powder) | Ex. 5 (Powder) | Ex. 6 (Powder) | Ex. 7 (Powder) | Ex. 8 (Powder) |
| --- | --- | --- | --- | --- | --- | --- | --- | --- |
| PA 6 | 100 | 95 | 90 | 100 | 95 | 90 | 95 | 90 |
| TSAN | 0 | 5 | 10 | 0 | 5 | 10 | 0 | 5 |
| Talc | 0 | 0 | 0 | 0 | 0 | 0 | 5 | 5 |
| Tensile Modulus | 2.9 | 2.7 | 2.9 | 2.7 | 3.4 | 3.9 | 3.8 | 6.0 |
| Elongation at break (%) | 3.8 | 24.8 | 24.7 | 2.7 | 32.0 | 21.8 | 5.3 | 3.4 |
| CTE (×10$^{-5}$/deg C.) | — | — | — | 7.9 | 6.5 | — | 5.9 | 4.8 |
| Node:Fibril ratio | — | 17.5 | — | — | 0.22 | 1.5 | — | 0.2 |

Examples 1 to 8 are comparative examples which show the effect of melt mixing PTFE with polyamide in pellet form compared to melt mixing PTFE with polyamide in powder form. Examples 1, 4 and 7 contain no PTFE and are useful for comparison.

From Table 2, it is clearly seen that inclusion of 5-wt. % TSAN in polyamide powder increased its tensile modulus by 26%, from 2.7 G Pa to 3.4 G Pa. In addition, the coefficient of thermal expansion (CTE) reduced by 1.4 units to 6.5 as illustrated in Examples 4 and 5. Also, the presence of filler (talc) further reduced CTE to 4.8 units and modulus increased to 6.0 G Pa as illustrated in Example 8.

In Example 5, the N:F ratio is 0.22 as opposed to 17.5 in samples fabricated from polyamide pellets with equivalent loading of TSAN. Additionally, when particulate fillers like Talc were included with polyamide powder and TSAN, the N:F ratio reduced further to 0.2. A lower node to fibril ratio is indicative of a more extensive fibrillar network.

Similar extent of fibrillation was observed in PBT powder/TSAN formulations (Ex. 11-15). On addition of TSAN to PBT pellet (in a ZSK-1), fibrillation was observed (Ex. 9-10) however; a drop in elongation was also documented. Whereas, on addition of TSAN to PBT powder at the same loading of 5 wt %, the modulus increased to 3.4 GPa as opposed to 3.2 GPa when PBT was in pellet form. Also, elongation was retained to 14.7% compared to 11.5% for PBT pellet/TSAN samples.

In examples summarized in Table 4, compositions were extruded in a co-rotating, twin-screw, 10-barrel extruder from WERNER & PFLEIDERER Co. (ZSK-2). TSAN was combined with PPE powder in the ZSK-2 extruder. The barrel temperature was set at 280° C. Torque was maintained at 65% to 70%. The feed rate was maintained at 15 kilograms per hour.

After mixing, the compositions were made into a particulate form by pelletizing. Pellets were injection molded into tensile bars using an L&T Demag De-Tech 60 T LNC4-E molding machine.

Tensile modulus and elongation at break were determined in accordance with ISO 527 at room temperature as described above.

TABLE 4

|  | Ex. 16 (Powder) | Ex. 17 (Powder) | Ex. 18 (Powder) | Ex. 19 (Powder) |
| --- | --- | --- | --- | --- |
| PPE | 100 | 97.5 | 95 | 93 |
| TSAN | 0 | 2.5 | 5 | 7 |
| Tensile Modulus | 2.6 | 2.5 | 2.6 | 2.7 |
| Elongation at break (%) | 26.6 | 24.5 | 28.9 | 25.5 |

There was no significant improvement in mechanical properties on addition of TSAN, despite the fact that PPE has sufficiently high viscosity to fibrillate PTFE.

During PPE processing, melt temperatures within the extruder were in excess of 330° C. due to shear heating of PPE. Since PTFE melts at 325° C., the fibrils generated due to effective shearing by PPE, melted, which was believed to attribute to the lack of increase in mechanical properties.

In Table 5, the order of mixing components was studied. A two-lobe extruder was used in every example, except for Ex. 20-21 where a three-lobe extruder was employed.

TABLE 3

|  | Ex. 9 (Pellet) | Ex. 10 (Pellet) | Ex. 11 (Powder) | Ex. 12 (Powder) | Ex. 13 (Powder) | Ex. 14 (Powder) | Ex. 15 (Powder) |
| --- | --- | --- | --- | --- | --- | --- | --- |
| PBT | 100 | 95 | 97 | 95 | 93 | 90 | 70 |
| TSAN | 0 | 5 | 3 | 5 | 7 | 10 | 10 |
| Talc | 0 | 0 | 0 | 0 | 0 | 0 | 20 |
| Tensile Modulus (GPa) | 2.4 | 3.2 | 3.2 | 3.4 | 3.6 | 3.6 | 6.1 |
| Elongation at break (%) | 99.7 | 11.5 | 97.8 | 14.7 | 8.9 | 8.1 | 2.0 |
| CTE ($\times 10^{-5}$/° C.) | 9.6 | — | — | — | — | 7.5 | 4.9 |
| Node:Fibril ratio | — | — | 0.4 | — | — | — | — |

TABLE 5

| Location of Addition | Component | Ex. 20 | Ex. 21 | Ex. 22 | Ex. 23 | Ex. 24 | Ex. 25 | Ex. 26 | Ex. 27 |
| --- | --- | --- | --- | --- | --- | --- | --- | --- | --- |
| Main Feeder | GTX | — | — | 100 | 90 | — | — | — | — |
|  | PPE | 33.8 | 28.9 | — | — | 35.0 | 33.2 | 33.2 | 34.0 |
|  | SEP | 7.9 | 7.9 | — | — | 8.0 | 7.6 | 7.6 | 8.0 |
|  | SEBS | 6.9 | 6.9 | — | — | 7.0 | 6.6 | 6.6 | 7.0 |
|  | Citric Acid | 0.7 | 0.7 | — | — | 0.70 | 0.7 | 0.7 | — |
|  | TSAN | — | 9.9 | — | 10 | — | 5.0 | — | — |
|  | PA 6 | — | — | — | — | — | — | — | — |
|  | PA 6 powder | — | — | — | — | — | — | — | — |
| Side feeder 1 | PA 6 | 9.9 | 5.0 | — | — | 10.00 | 9.5 | 9.5 | 9.9 |
|  | PA 66 | 39.7 | 38.7 | — | — | 38.90 | 36.9 | 36.9 | 40.0 |
|  | PA 6 powder | — | — | — | — | — | — | 5.0 | — |
|  | CA func PPE | — | — | — | — | — | — | — | — |
|  | TSAN | — | — | — | — | — | — | — | — |
| Side feeder 2 | CCB | 1.5 | 1.5 | — | — | — | — | — | — |

TABLE 5-continued

| | | | | | | | | |
|---|---|---|---|---|---|---|---|---|
| Notched Izod Impact | | — | — | — | — | 59.34 | 22.57 | 18.22 | 68.84 |
| Tensile Modulus | | 2.1 | 2.3 | 2.25 | 2.38 | 1.91 | 1.91 | 2.1 | 1.95 |
| Elongation at Break | | 33.59 | 11.28 | 25.46 | 3.79 | 49.25 | 42.9 | 26.38 | 35.79 |

| Location of Addition | Component | Ex. 28 | Ex. 29 | Ex. 30 | Ex. 31 | Ex. 32 | Ex. 33 | Ex. 34 |
|---|---|---|---|---|---|---|---|---|
| Main Feeder | GTX | — | — | — | — | — | — | — |
| | PPE | 34.0 | 24.9 | 24.9 | 15.0 | 15.0 | — | — |
| | SEP | 8.0 | 8.0 | 8.0 | 8.0 | 8.0 | — | — |
| | SEBS | 7.0 | 7.0 | 7.0 | 7.0 | 7.0 | — | — |
| | Citric Acid | — | — | — | — | — | — | — |
| | TSAN | — | — | — | — | — | — | 2.0 |
| | PA 6 | — | — | — | — | — | 43.3 | 42.3 |
| | PA 6 powder | — | — | — | — | — | 11.6 | 10.6 |
| Side feeder 1 | PA 6 | 8.5 | 14.0 | 14.0 | 19.0 | 19.0 | — | — |
| | PA 66 | 38.4 | — | — | — | — | — | — |
| | PA 6 powder | — | 45.0 | 45.0 | 50.0 | 50.0 | — | — |
| | CA func PPE | — | — | — | — | — | 45.0 | 45.0 |
| | TSAN | 3.0 | — | — | — | — | — | — |
| Side feeder 2 | CCB | — | — | — | — | — | — | — |
| Notched Izod Impact | | 7.75 | 14.6 | 8.46 | 9 | 10.3 | 68.8 | 83.86 |
| Tensile Modulus | | 2.07 | 23.63 | 2.24 | 225 | 2.43 | 2 | 2.3 |
| Elongation at Break | | 15.57 | 2.13 | 20.38 | 19.05 | 23.71 | 56.7 | 116.7 |

Examples 20-34 contained a small amount of standard additives. Examples 33 and 34 both use poly(arylene ether) which has been melt mixed with a standard amount of citric acid (referred to in the table as CA func PPE). In Examples 33 and 34 the polyamide is added upstream and the poly(arylene ether) is added downstream. Example 33 is a comparative example that does not contain TSAN. In contrast Example 34 contains TSAN which is added upstream with the polyamide. A significant increase in impact strength, tensile modulus and tensile elongation is seen in Example 34 when compared to Example 33.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the invention scope thereof. It is, therefore intended that the invention not be limited to the particular embodiment disclosed as the best mode contemplated for carrying out this invention, but that the invention will include all embodiments falling within the scope of appended claims.

What is claimed is:

1. A method of making a resin composition, comprising:
   melt mixing a fluoropolymer having a softening temperature with a first polymer comprising a polyamide powder or a polyester powder at a temperature below the softening temperature of the fluoropolymer to form a first melt blend;
   fibrillating the fluoropolymer in the first melt blend to form a fibrillar network in the first melt blend; and
   melt mixing the first melt blend having the fibrillar network with i) a poly(arylene ether) and a compatibilizing agent or ii) a poly(arylene ether) and a reaction product of a poly(arylene ether) and a compatibilizing agent.

2. The method of claim 1, further comprising melt mixing a filler with the first melt blend.

3. The method of claim 2, wherein the filler is selected from the group consisting of calcium carbonate, talc, glass fibers, carbon fibers, magnesium carbonate, mica, silicon carbide, kaolin, wollastonite, calcium sulfate, barium sulfate, titanium, silica, carbon black, ammonium hydroxide, magnesium hydroxide, aluminum hydroxide, and combinations comprising at least one of the foregoing.

4. The method of claim 1, wherein the polyamide comprises nylon 6.

5. The method of claim 1, wherein the fluoropolymer comprises polytetrafluoroethylene.

6. The method of claim 1, wherein the fibrillated fluoropolymer forms a continuous network in the composition.

7. A composition made according to a method comprising:
   melt mixing a fluoropolymer having a softening temperature with a first polymer comprising a polyamide powder or a polyester powder at a temperature below the softening temperature of the fluoropolymer to form a first melt blend;
   fibrillating the fluoropolymer in the first melt blend to form a fibrillar network in the first melt blend; and
   melt mixing the first melt blend having the fibrillar network with i) a poly(arylene ether) and a compatibilizing agent or ii) a poly(arylene ether) and a reaction product of a poly(arylene ether) and a compatibilizing agent.

8. The composition of claim 7 wherein the composition has a node to fibril ratio less than or equal to 5.

9. An article comprising the composition of claim 7.

10. A method of preparing a resin composition:
    melt mixing a first polymer comprising a polyamide powder with a polytetrafluoroethylene at a temperature less than a softening temperature of the polytetrafluoroethylene to form a first melt blend;
    fibrillating the polytetrafluoroethylene in the first blend to form a fibrillar network in the first melt blend; and
    melt mixing the first melt blend having the fibrillar network with i) a poly(arylene ether) and a compatibilizing agent or ii) a poly(arylene ether) and a reaction product of the poly(arylene ether) and a compatibilizing agent.

11. The method of claim 10, further comprising forming pellets from the first melt blend prior to melt mixing the first blend with the poly(arylene ether) and the compatibilizing agent or the poly(arylene ether) and the reaction product of the poly(arylene ether) and the compatibilizing agent.

12. The method of claim 10, wherein the fibrillated polytetrafluoroethylene forms a continuous network in the composition.

13. The method of claim 10, further comprising melt mixing a filler with the first melt blend, wherein the filler is selected from the group consisting of calcium carbonate, talc, glass fibers, carbon fibers, magnesium carbonate, mica, silicon carbide, kaolin, wollastonite, calcium sulfate, barium sulfate, titanium, silica, carbon black, ammonium hydroxide, magnesium hydroxide, aluminum hydroxide, and combinations comprising at least one of the foregoing.

14. A composition made according to the method of claim 10.

15. A method of preparing a resin composition:
   melt mixing a first polymer comprising a polyester powder with a polytetrafluoroethylene at a temperature less than a softening temperature of the polytetrafluoroethylene to form a first melt blend;
   fibrillating the polytetrafluoroethylene in the first blend to form a fibrillar network in the first melt blend; and
   melt mixing the first melt blend having the fibrillar network with a poly(arylene ether) and a compatibilizing agent or the poly(arylene ether) and a reaction product of the poly(arylene ether) and the compatibilizing agent.

16. The method of claim 15, further comprising forming pellets from the first melt blend prior to melt mixing the first blend with the poly(arylene ether) and the compatibilizing agent or the poly(arylene ether) and the reaction product of the poly(arylene ether) and the compatibilizing agent.

17. The method of claim 15, wherein the fibrillated polytetrafluoroethylene forms a continuous network in the composition.

18. The method of claim 15, further comprising melt mixing a filler with the first melt blend, wherein the filler is selected from the group consisting of calcium carbonate, talc, glass fibers, carbon fibers, magnesium carbonate, mica, silicon carbide, kaolin, wollastonite, calcium sulfate, barium sulfate, titanium, silica, carbon black, ammonium hydroxide, magnesium hydroxide, aluminum hydroxide, and combinations comprising at least one of the foregoing.

19. The method of claim 15, wherein the polyester comprises poly(butylene terephthalate).

20. A composition made according to the method of claim 15.

21. An article comprising the composition of claim 20.

* * * * *